United States Patent
Mathieu et al.

(10) Patent No.: US 11,067,053 B2
(45) Date of Patent: Jul. 20, 2021

(54) METHOD FOR ORIENTATING THE BLADES OF A TURBINE

(71) Applicant: GE Renewable Technologies, Grenoble (FR)

(72) Inventors: Alain Mathieu, Grenoble (FR); Antoine Bombenger, Grenoble (FR)

(73) Assignee: GE Renewable Technologies, Grenoble (FR)

( * ) Notice: Subject to any disclaimer, the term of this patent is extended or adjusted under 35 U.S.C. 154(b) by 80 days.

(21) Appl. No.: 16/462,590

(22) PCT Filed: Nov. 9, 2017

(86) PCT No.: PCT/EP2017/078783
§ 371 (c)(1),
(2) Date: May 21, 2019

(87) PCT Pub. No.: WO2018/091352
PCT Pub. Date: May 24, 2018

(65) Prior Publication Data
US 2020/0080532 A1    Mar. 12, 2020

(30) Foreign Application Priority Data
Nov. 21, 2016   (EP) .................................. 16290219

(51) Int. Cl.
*F03B 3/14*    (2006.01)
*F03B 15/06*   (2006.01)
(Continued)

(52) U.S. Cl.
CPC .............. *F03B 3/145* (2013.01); *F03B 13/14* (2013.01); *F03B 13/264* (2013.01); *F03B 15/06* (2013.01);
(Continued)

(58) Field of Classification Search
None
See application file for complete search history.

(56) References Cited

U.S. PATENT DOCUMENTS

| | | | | |
|---|---|---|---|---|
| 2,357,228 A | * | 8/1944 | Werner | ............... F04D 15/0055 416/157 R |
| 8,631,638 B2 | * | 1/2014 | Carlos | ...................... F02C 6/00 60/39.181 |

(Continued)

FOREIGN PATENT DOCUMENTS

| | | |
|---|---|---|
| AU | 2014 259 522 A1 | 5/2015 |
| DE | 10 2014 200576 B3 | 2/2015 |

(Continued)

OTHER PUBLICATIONS

PCT Search Report, dated Feb. 12, 2018.
(Continued)

*Primary Examiner* — Ninh H. Nguyen
*Assistant Examiner* — Jason Fountain
(74) *Attorney, Agent, or Firm* — Dority & Manning, P.A.

(57) ABSTRACT

This method is for orientating the blades (40) of a turbine (4) past a non-reachable range of positions ($\alpha 1$, $\alpha 2$) in a power plant (2), said blades (40) being rotatable around orientation axes (X40) distinct from a rotation axis (X) of the turbine (4), the turbine (4) comprising means (42, 44, 46) for orientating the blades (40), said means being adapted to exert an adjustable torque on the blades (40). The method comprises steps consisting in a) stopping the energy production of the turbine (4), b) setting a water flow which runs the turbine (4) to a value inferior to a normal energy production value, c) rotating the turbine (4) in a motor mode using energy from a grid, d) adjusting the torque delivered by the means for orientating the blades (40) to a reduced value while the turbine (4) is still rotating, so that the blades (40) are free to rotate around their orientation axes (X40), (Continued)

under action of a hydraulic torque exerted by the water, past the non-reachable range of positions, e) once the blades (40) have overcome the non-reachable range of positions, adjusting the torque delivered by the means for orientating the blades (40) to a normal value superior to the reduced value, so that the rotation of the blades (40) around their orientation axis (X40) is stopped in a determined position.

13 Claims, 7 Drawing Sheets

(51) Int. Cl.
  *F03B 13/26* (2006.01)
  *F03B 13/14* (2006.01)
  *F04D 13/06* (2006.01)
(52) U.S. Cl.
  CPC ........ *F04D 13/06* (2013.01); *F05B 2210/404* (2013.01); *F05B 2260/74* (2013.01); *Y02E 10/20* (2013.01)

(56) References Cited

U.S. PATENT DOCUMENTS

| | | |
|---|---|---|
| 2010/0237626 A1 | 9/2010 | Hamner |
| 2010/0244452 A1 | 9/2010 | Gardner |
| 2012/0038173 A1* | 2/2012 | Carlos ............... F03B 13/08 290/1 R |

FOREIGN PATENT DOCUMENTS

| | | |
|---|---|---|
| GB | 750 951 A | 6/1956 |
| GB | 2 392 713 A | 3/2004 |
| WO | WO 03/014565 A1 | 2/2003 |

OTHER PUBLICATIONS

EP Search Report, dated May 4, 2017.
Related U.S. Appl. No. 16/191,951, filed Nov. 15, 2018.
Related U.S. Appl. No. 16/325,095, filed Aug. 18, 2017.

* cited by examiner

METHOD FOR ORIENTATING THE BLADES OF A TURBINE

The present invention concerns a method for orientating the blades of a turbine past a non-reachable range of positions in a power plant.

In order to optimize and increase the production of a turbine of a power plant such as a tidal power plant, there is a great benefit in the possibility of reversing the blades and keeping the possibility of adjusting the orientation of the blades during operation.

As known from AU-A-2014/259522, turbines are often equipped with a servomotor and a transmission system adapted to change the orientation angle of the blades to adjust the operation parameters and increase the performances. However, the transmission systems often include levers and servomotors exerting pressure forces along the rotation axis of the turbine, resulting in dead centers and non-reachable ranges of positions for the blades. The optimization of the energy production is therefore unsatisfactory.

From the same reference, it is known to overcome the dead centers by adding an auxiliary servomotor adapted to drive the blades in the ranges of positions which are not reachable using the primary servomotor. However, such solutions are costly due to the heavy mechanical changes required on the structure of the turbine. Moreover, the added components reduce the hydraulic performances of the turbine.

Another reference that discloses further auxiliary apparatus for overcoming the dead center issue is GB 750,951.

The aim of the invention is to provide a new method of orientating a random number of blades of a turbine, which needs the fewest possible changes on the standard structure of a turbine.

To this end, the invention concerns a method for orientating the blades of a turbine past a non-reachable range of positions in a power plant, said blades being rotatable around orientation axes distinct from a rotation axis of the turbine, the turbine comprising means for orientating the blades, said means being adapted to exert an adjustable torque on the blades, wherein the method comprises one or more of the following steps:
 a) stopping the energy production of the turbine;
 b) setting a water flow which runs the turbine to a value inferior to a normal energy production value;
 c) rotating the turbine in a motor mode using energy from a grid;
 d) adjusting the torque delivered by the means for orientating the blades to a reduced value while the turbine is still rotating, so that the blades are free to rotate around their orientation axes, under action of a hydraulic torque exerted by the water, past the non-reachable range of positions; and/or
 e) once the blades have overcome the non-reachable range of positions, adjusting the torque delivered by the means for orientating the blades to a normal value superior to the reduced value, so that the rotation of the blades around their orientation axis is stopped in a determined position.

Thanks to the invention, the blades can be oriented past non-reachable positions using a self-reversing property of the blades under action of the water flow. There is therefore no need for additional servomotors and mechanical transmission systems. The cost of the turbine is therefore not increased, and the hydraulic performances of the turbine are not harmed by additional components. Further, the means for orientating the blades may be different from a servomotor exerting pressure forces.

The invention is particularly advantageous over GB 750, 951 in that the invention overcomes the problem of having to bring the turbine to a standstill to rotate the blades.

According to further aspects of the invention which are advantageous but not compulsory, such a method may incorporate one or several of the following features:
 At step b) the water flow may be set to a value comprised between 0 and 10% of the normal energy production value.
 At step b), a water flow regulation system of a water channel, in which the turbine is located, is partially or totally closed.
 At step d), a control pressure in a chamber of a servomotor may be modified, which in a preferred embodiment, may be reduced. In a preferred embodiment, the orientation of the blades may be controlled and synchronized by modification of the control pressure inside the servomotor chamber. Preferably, said control pressure controlling the angular position of nuts or similar means linked to levers which drive the rotations of the blades around their orientation axes, said servomotor, said nuts and said levers forming the means for orientating the blades.
 The method may comprise, prior to step c), a further step consisting in driving the nuts in a determined position corresponding to a limit of the non-reachable range of positions of the blades, preferably using the servomotor.
 At step e), the nuts may be stabilized using the servomotor in angular positions corresponding to an opposed limit of the non-reachable range of positions of the blades.
 At step e), the control pressure may be increased in a chamber of the servomotor so that a resistive torque is applied against the rotation of the blades around their orientation axes under action of the hydraulic torque exerted by the water.
 The method may comprise, before step e), a further step consisting in varying the power delivered to the turbine, thereby preferably controlling the hydraulic torque, so that the position of the blades may overcome a dead center of the means for orientating the blades comprised within the non-reachable range of positions.
 The method may also comprise controlling guide vanes to control the flow of water through the turbine, thereby preferably controlling the hydraulic torque preferably provided by the water.
 The method may comprise, after step e), a further step consisting in stopping the rotation of the turbine in motor mode.
 The method may comprise, after stopping the rotation of the turbine in motor mode, a further step consisting in orientating, using the servomotor, the blades in an energy production position and setting back the water flow to the normal energy production value.
 The method may comprise adjusting the hydraulic torque exerted by the water by adjusting guide vanes arranged to control the flow of water to the turbine. In this way, the flow of water and therefore the hydraulic torque may be increased by increasing the opening of the guide vanes; conversely, the flow of water and therefore the hydraulic torque may be decreased by decreasing the opening of the guide vanes. The hydraulic torque may be increased by opening the guide vanes to rotate the blades to overcome or move past the non-reachable range of positions.

According to a further aspect, the invention resides in a hydro turbine for generating power from water, wherein the hydro turbine is rotatable about a central rotation axis and comprises at least one blade. Preferably each blade is rotatable about an orientation axis. The turbine and/or each blade is preferably arranged to rotate each blade, preferably between a direct configuration and an indirect configuration, under the action of a hydraulic torque, preferably provided by the water.

Each of the blades may be associated with a central axis. Each blade may be rotatable about its associated central axis between a direct configuration and an indirect configuration, preferably under the action of a hydraulic torque, preferably provided by the water.

In a preferred embodiment, the at least one blade of the turbine may be arranged to rotate past a non-reachable range of positions in a power plant under the influence of the hydraulic torque.

The turbine may comprise orientating means for orientating the at least one blade. Preferably, the operating means may comprise a servomotor which may comprise a servomotor chamber which may be filled with a fluid under a control pressure. The control pressure may be adjustable to control the position of the at least one blade. The servomotor may comprise a movable housing which may drive the rotation of the at least one blade, preferably around its orientation axis.

According to a further aspect, the invention resides in a method of using the hydro turbine disclosed above to orientate the at least one blade of the turbine.

It is to be appreciated that any of the above aspects, embodiments and features of any of the above aspects or embodiments of the invention may be readily combined, as will be readily apparent to the skilled person.

The invention will now be explained in correspondence with the annexed figures and as an illustrative example, without restricting the scope of the invention. In the annexed figures.

Figure 1:
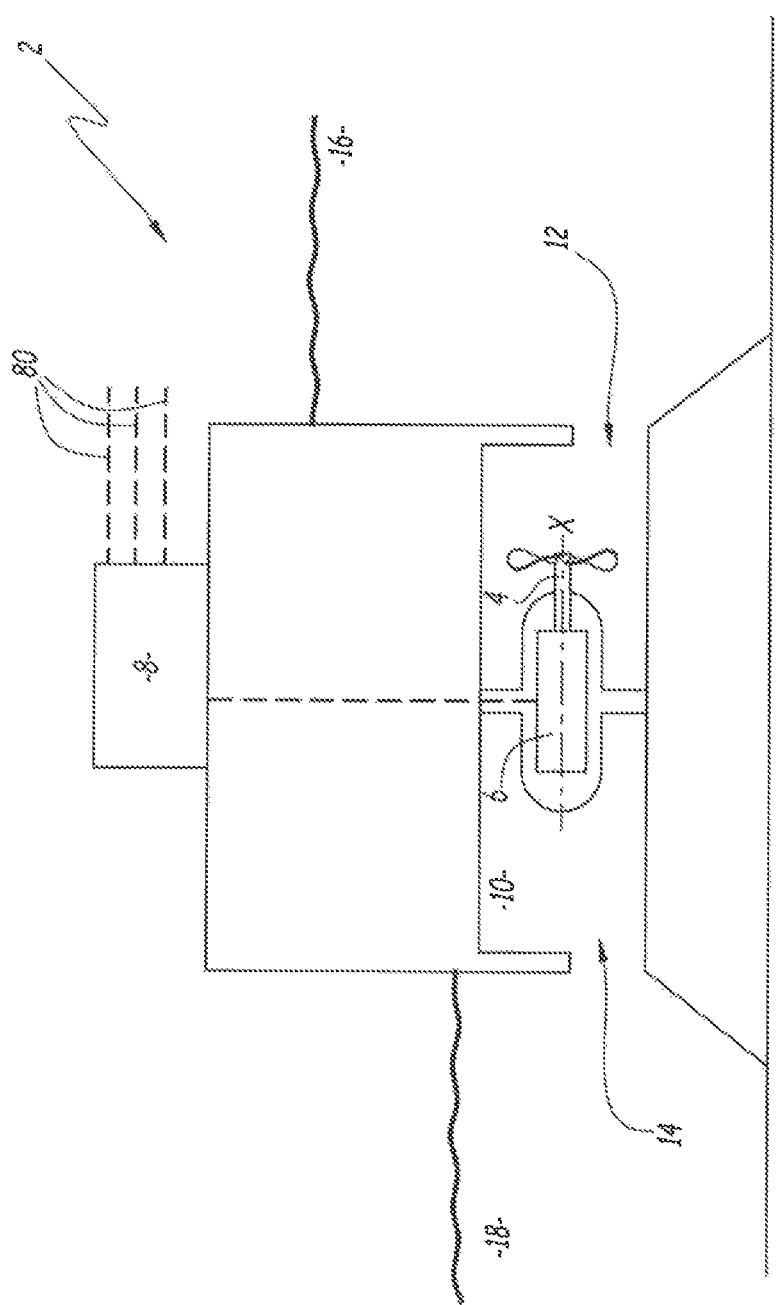
FIG. 1 is a schematic representation of a power plant comprising a turbine with which the method of the invention can be implemented.

A power plant 2 is represented on FIG. 1. More precisely, the power plant 2 is a tidal power plant, which uses the energy of tides to run turbines and generate electrical energy.

The power plant 2 includes a turbine 4, an energy production system 6 and a grid 8, connected to the energy production system 6, and from which depart power lines 80. The turbine 4 is centered on a central rotation axis X. The energy production system 6 is driven by the turbine 4. The energy production system 6 is reversible, in that it can selectively be driven by the turbine 4 in generator mode to generate electrical energy to feed the grid 8, or drive the turbine 4 in motor mode by consuming electrical energy from the grid 8. In motor mode, the energy production system 6 is able to drive the turbine 4 at a variable rotation speed.

The turbine 4 is located in a water channel 10 having an inlet port 12 and an outlet port 14. The power plant 2 comprises a high water level side 16 and a low water level side 18. In the configuration of FIG. 1, the water channel 10 communicates with the high water level side 16 by the inlet port 12, while the water channel 10 communicates with the low water level side 18 by the outlet port 14. Depending on the tide configuration, the high and low water level sides 16 and 18 can be inverted and correspond either to an upstream of downstream side of the power plant 2.

According to a non-shown embodiment of the invention, instead of a tidal power plant, the power plant 2 may be of a different type.

The flow of water through the turbine 4 may controlled using guide vanes (not shown).

Figure 2:
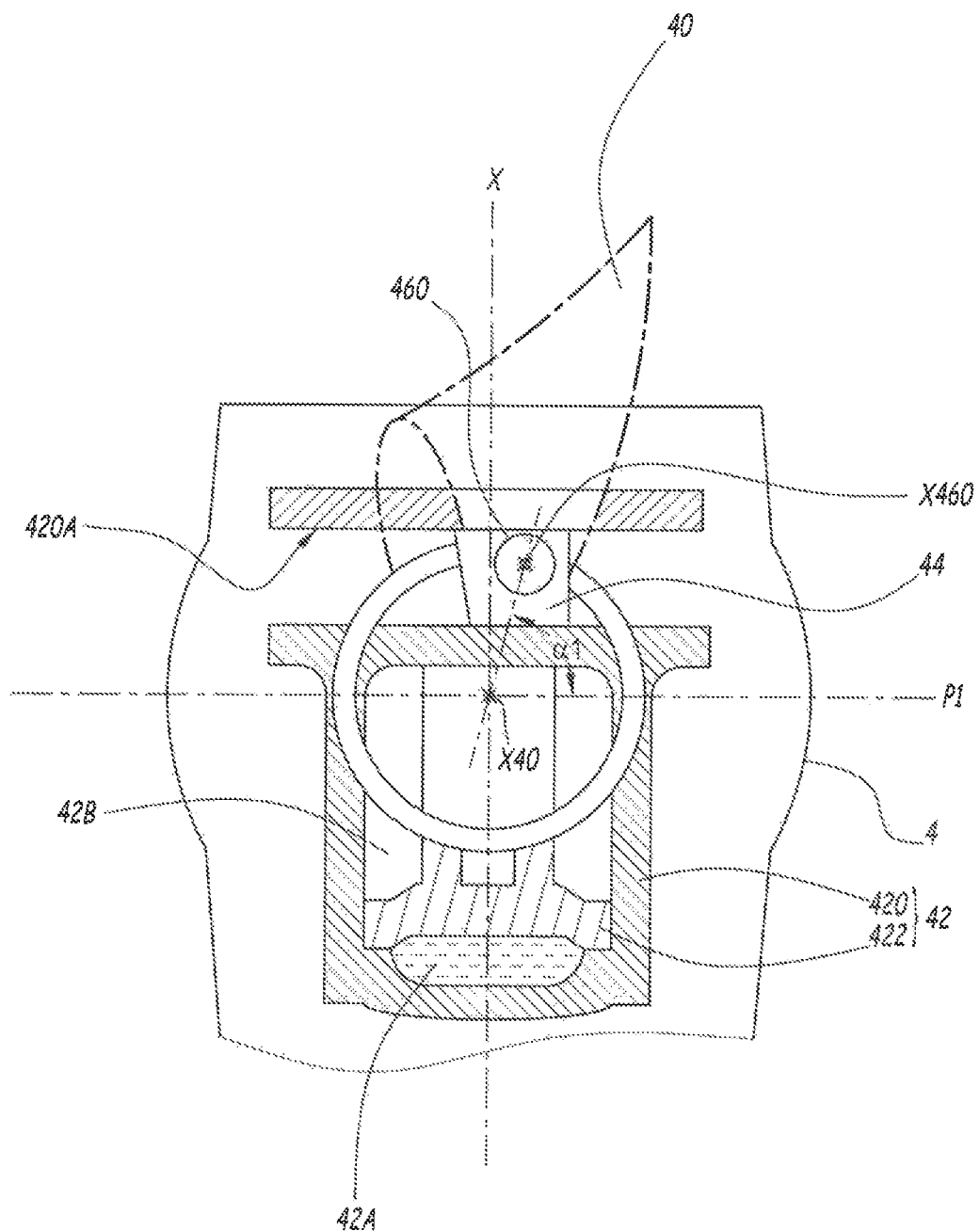
FIG. 2 is a partially sectioned schematic view of the turbine of FIG. 1.
Figure 3:
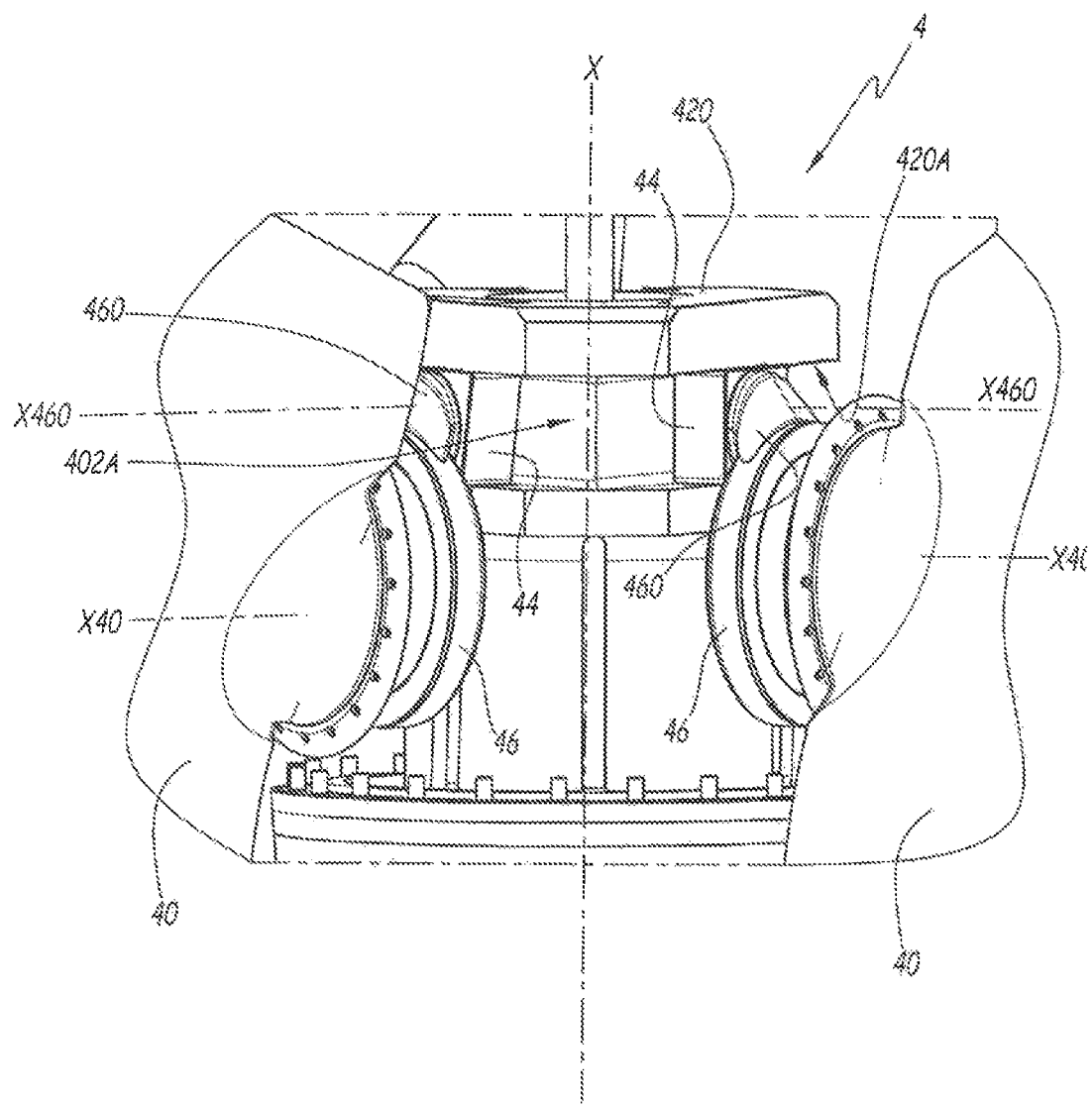
FIG. 3 is a perspective view of a portion of the turbine of FIG. 2.

The turbine 4 is more precisely represented on FIGS. 2 and 3. The turbine 4 comprises blades 40 which are rotatable around orientation axes X40, distinct from the rotation axis X of the turbine 4. In the present case, the orientation axes X40 are perpendicular to the rotation axis X of the turbine 4. The turbine 4 further comprises means for orientating the blades 40 which are adapted to exert an adjustable torque on the blades 40. These means include a servomotor 42 which comprises a movable housing 420 and a fixed piston 422. The housing 420 and the piston 422 are movable with respect to each other along the rotation axis X. The housing 420 and the piston 422 define two chambers 42A and 42B adapted to be filled or emptied by a hydraulic fluid in order to drive the translation of the movable housing 420 with respect to the fixed piston 422. The first chamber 42A has a global cylindrical shape, while the second chamber 42B has an annular shape centered on the axis X.

The movable housing 420 comprises rectilinear grooves 420A, oriented perpendicular to the axis X, and in which are housed nuts 44 linked to levers 46 which drive the rotation of the blades 40 around their orientation axes X40. Under action of the translation of the housing 420, the nuts 44 slide in the grooves 420A and drive the levers 46 clockwise or counterclockwise, exerting a torque on the blades 40. Such a principle is well-known and will not be further detailed. The servomotor 42, the nuts 44 and the levers 46 form the means for orientating the blades 40.

Such a design allows orientating the blades 40 within a reachable range of positions around a non-reachable range of positions which includes a dead center, due to the levers 46. To drive the blades 40 in this non-reachable range and past the dead center without adding auxiliary servomotors and transmissions, the turbine 4 is controlled using a method which comprises the following steps.

A first step consists in stopping the energy production of the turbine 4. The rotation of the turbine 4 around its rotation axis X is stopped, and no more electrical power is produced.

In a second step, the water flow in the channel 10 is set to a value inferior to a normal energy production value. For example, the water flow may be set to a value between 0 and 10% of the normal energy production value, or a different ratio inferior to 100% of the normal energy production value. The water flow can be completely stopped. For example, the water flow can be reduced by closing totally or partially a regulating mechanism of the water flow when the turbine 4 runs in a direct mode or when the turbine 4 runs in indirect mode, that is to say when the water flow goes from the outlet 14 to the inlet 12.

An optional third step consists in driving the nuts 44 in a determined position corresponding to a limit of the non-reachable range of positions of the blades 40, using the servomotor 42. The levers 46 comprise a shaft 460 mounted rotatable in the nuts 44. The dead center corresponds to the position when a central axis X460 of the shaft 460 crosses the central axis X. The movement of the blades 40 around the dead center is mechanically possible but implies unfavorable stresses and hydraulic efforts from the servomotor 42. The range of positions non-reachable using the means for orientating the blades 40 lies between a first angle $\alpha 1$ defined between a plane P1 perpendicular to axis X and comprising the axes X40, on a first side of the dead center, and a second angle $\alpha 2$ on the other side of the dead center. The values of $\alpha 1$ and $\alpha 2$ can change depending on the design of the turbine 4.

The position of the nuts 44 is adjusted by varying a control pressure in the chambers 42A and 42B.

A fourth step consists in rotating the turbine 4 in a motor mode and in clockwise or counterclockwise direction, using energy from the grid 8. The energy production system 6 therefore consumes energy to produce a torque delivered to the turbine 4.

In a fifth step, the torque delivered by the means for orientating the blades 40 is set to a reduced value while the turbine 4 is still rotating, so that the blades 40 are free to rotate around their orientation axes X40, under action of a hydraulic torque exerted by the fluid, past the non-reachable range of positions. The level of hydraulic torque exerted by the fluid is controlled by controlling the amount the control vanes are open. Specifically, the hydraulic torque is reduced by reducing the amount the guide vanes are open, and the hydraulic torque is increased by increasing the amount the guide vanes are open.

The control pressure in one of the chambers 42A and 42B is reduced, so that hydraulic pressure does not resist to the self-rotation of the blades 40 induced by the torque exerted by water under action of the rotation on the turbine 4. The control pressure in the other chamber 42A or 42B is also controlled so that the self-rotation of the blades 40 does not drive the blade 40 in a non-desired direction. Orientation of the blades 40 in the non-reachable range is therefore obtained, without any additional components on the turbine 4.

In an optional sixth step, the power delivered to the turbine 4 by the power plant 2 is adjusted so that the position of the blades 40 overcome the dead center, which is located at an angle of 90° with respect to the plane P1, and ultimately overcome the non-reachable range of positions.

Once the blades 40 have overcome the non-reachable range of positions, in a seventh step, the torque delivered by the means for orientating the blades 40 is adjusted back to a normal value superior to the reduced value, so that the rotation of the blades 40 around their orientation axis X40 is stopped in a determined position. This is done by increasing the control pressure in one of the chambers 42A and 42B so that a resistive torque is applied against the rotation of the blades 40 around their orientation axes X40.

The nuts 44 are stabilized using the servomotor 42 in angular positions corresponding to the opposed limit of the non-reachable range of positions of the blades 40, with respect to the position of the nuts 44 before the self-rotation takes place.

In an eighth step, the rotation of the turbine 4 in motor mode is stopped. After stopping the rotation of the turbine 4 in motor mode, a further step consists in orientating, using the servomotor 42, the blades 40 in an energy production orientation and setting back the water flow to the normal energy production value, so that the turbine 4 can start again producing electrical power.

FIGS. 4 to 7 show various cases of orientation of one blade 40 and management of the control pressure, represented by hatchings in the chambers 42A and 42B, in the servomotor 42 depending on the desired orientation.

Figure 4:
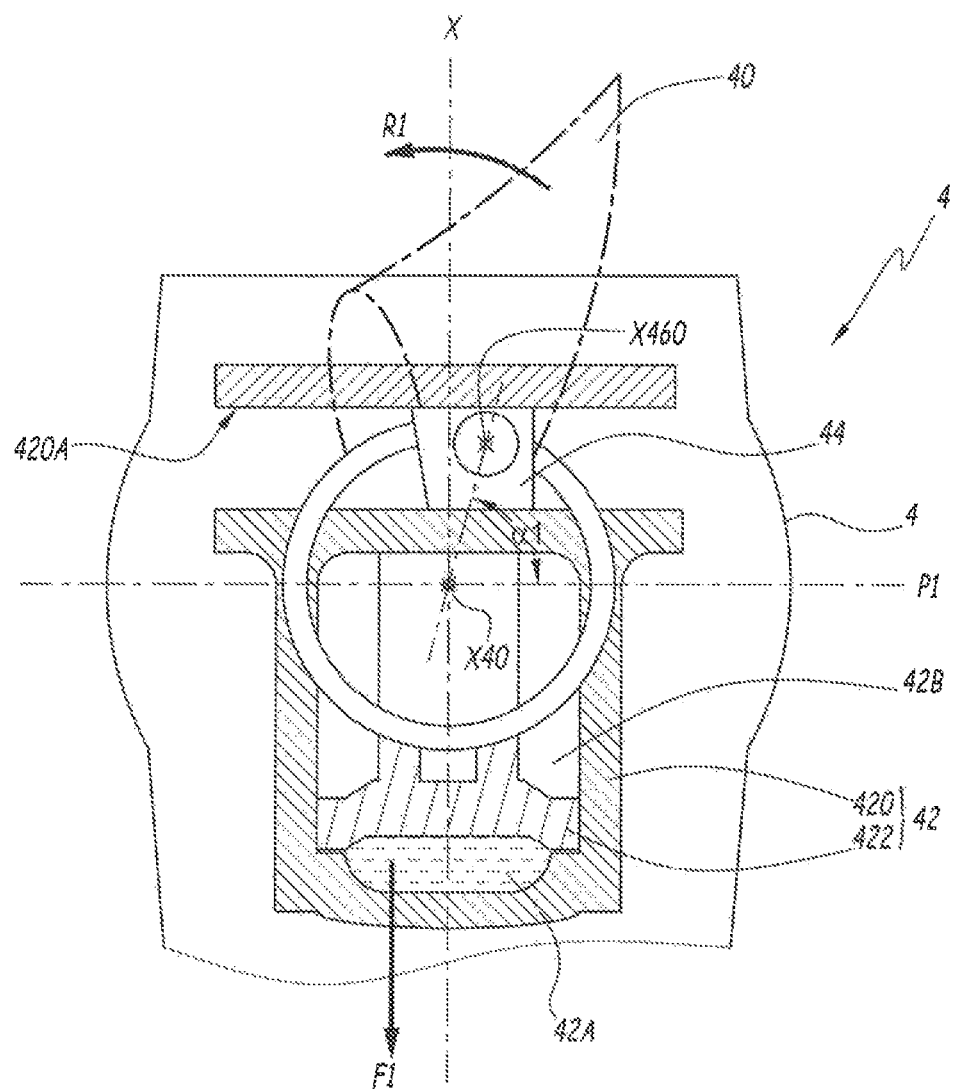
FIGS. 4 to 7 are schematic representations of various configurations of blade orientations operable with the method of the invention.
Figure 5:
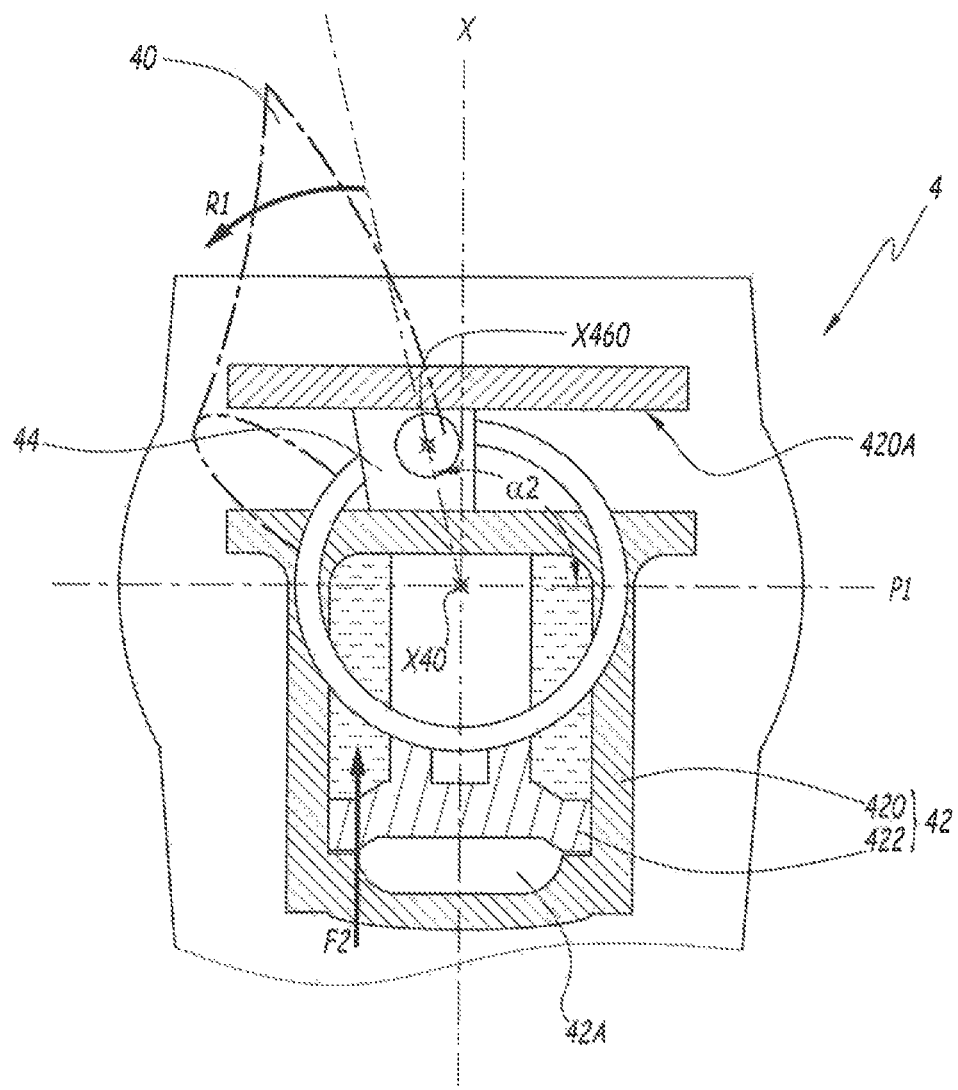

On FIGS. 4 and 5, the blade 40 passes from a direct configuration to an indirect configuration. On FIG. 4, the nut 44 is initially positioned in the angle $\alpha 1$, and a normal control pressure is set in the cylindrical chamber 42A, creating a resisting force F1 preventing the nut 44 to rotate counterclockwise along arrow R1. To allow rotation, the control pressure in the chamber 42A is reduced and the control pressure in chamber 42B is increased, as shown on FIG. 5. The rotation R1 takes place, and the nut 44 is stabilized at the angle $\alpha 2$ by a resisting force F2 exerted by the control pressure in the annular chamber 42B, which prevents the housing 420 from going further downward.

Figure 6:
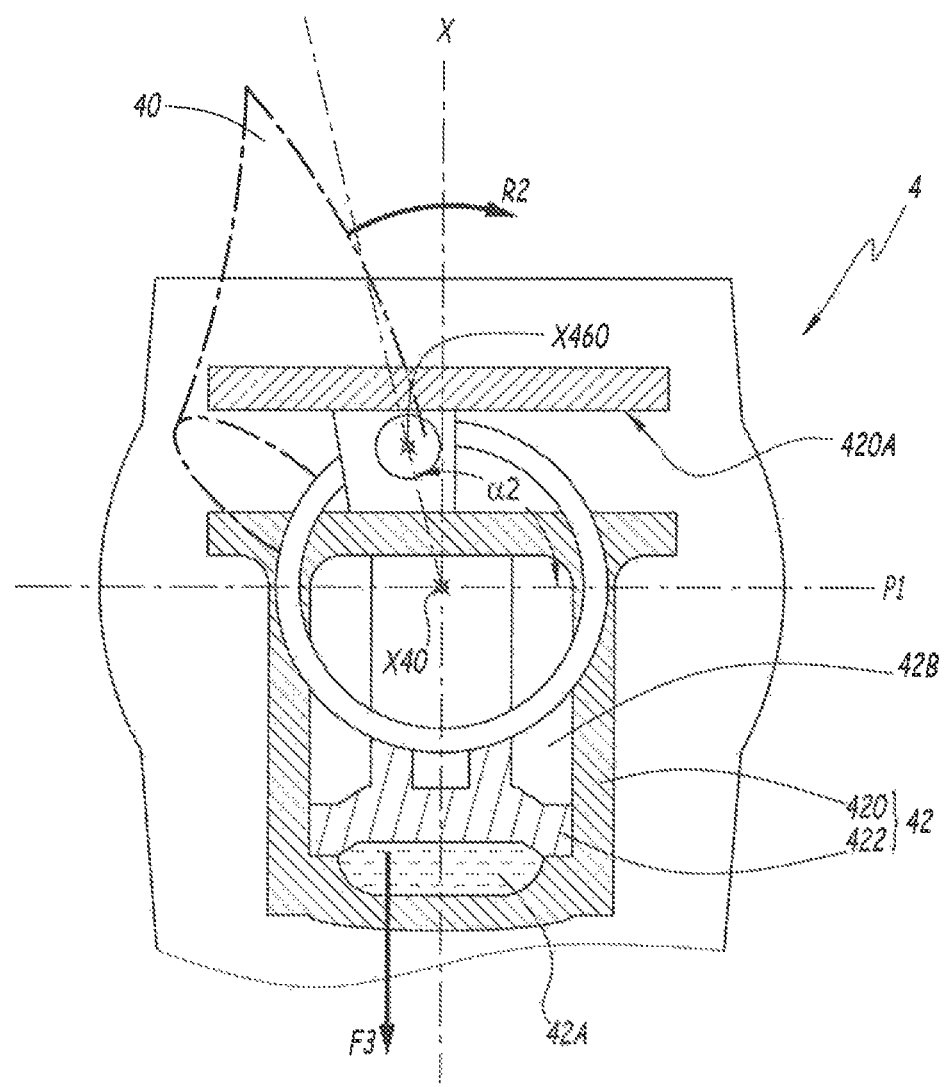
Figure 7:
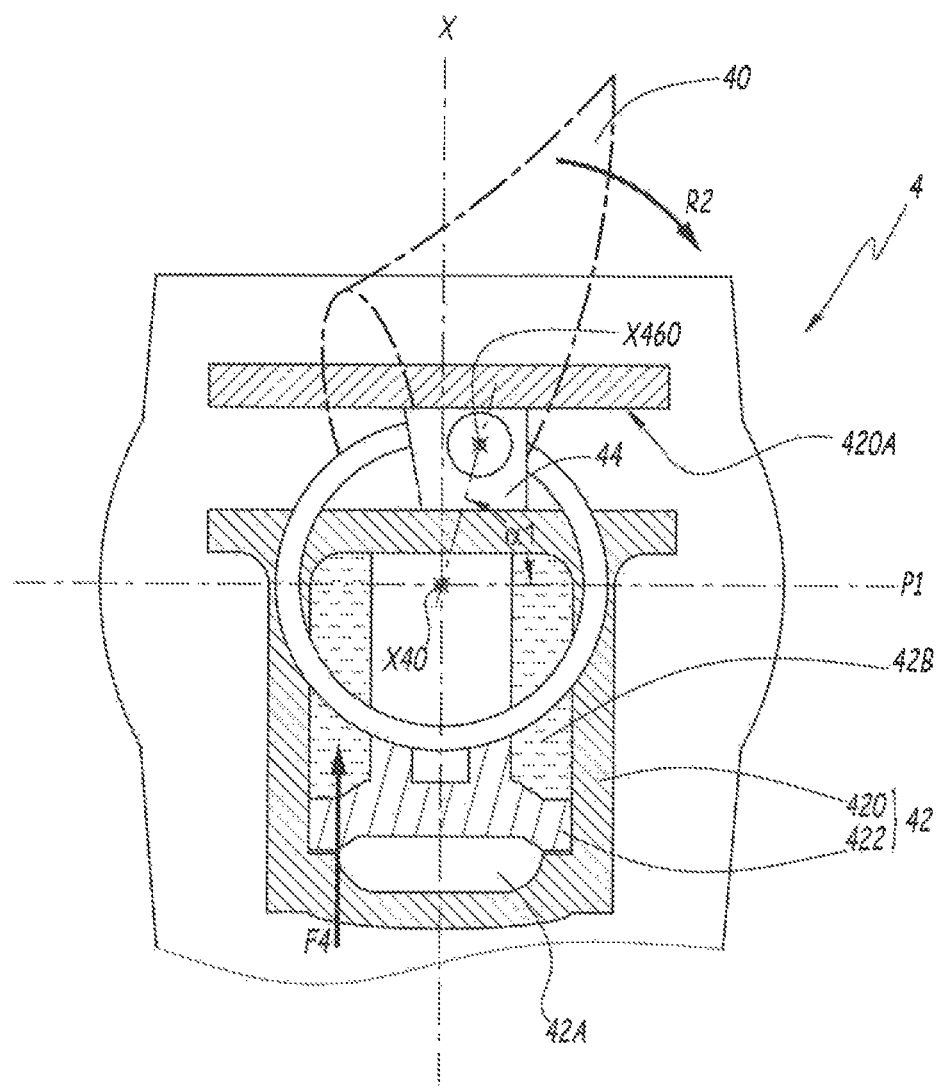

On FIGS. 6 and 7, the blade 40 passes from an indirect configuration to a direct configuration. On FIG. 6, the nut 44 is initially positioned at the angle $\alpha 2$, and the control pressure in the cylindrical chamber 42A exerts a resisting force F3 preventing the nut 44 from rotating clockwise in the direction of arrow R2. To allow rotation, the control pressure is switched from the cylindrical chamber 42A to the annular chamber 42B. The rotation R2 occurs, and once the nut 44 reaches the angle $\alpha 1$, a resisting force F4 prevents the housing 420 from going further downward.

The invention claimed is:

1. A method for orientating blades of a turbine past a non-reachable range of positions in a power plant, the blades being rotatable around orientation axes distinct from a rotation axis of the turbine, the turbine comprising means for orientating the blades, said means being adapted to exert an adjustable torque on the blades, the method comprising:
    a) stopping energy production of the turbine;
    b) setting a water flow which runs the turbine to a value less than a normal energy production value;
    c) rotating the turbine in a motor mode using energy from a grid;
    d) adjusting the torque on the blades exerted by the means for orientating the blades to a reduced value while the turbine is still rotating and reducing a control pressure in a chamber of a servomotor such that the blades self-rotate around their orientation axes past the non-reachable range of positions under action of a hydraulic torque exerted by the water;
    e) once the blades have overcome the non-reachable range of positions, adjusting the torque to a normal value greater than the reduced value so that the rotation of the blades around their orientation axis is stopped in a determined position.

2. The method of claim 1, wherein at step b) the water flow is set to a value comprised between 0 and 10% of the normal energy production value.

3. The method of claim 1, wherein at step b), a water flow regulation system of a water channel in which the turbine is located, is partially or totally closed.

4. The method of 1, wherein at step d), said control pressure controlling an angular position of nuts linked to levers which drive the rotations of the blades around their orientation axes, said servomotor, said nuts and said levers forming the means for orientating the blades.

5. The method of claim 4, further comprising, prior to step c), in driving the nuts corresponding to a limit of the non-reachable range of positions of the blades, using the servomotor.

6. The method of claim 4, wherein at step e), the nuts are stabilized using the servomotor in angular positions corresponding to an opposed limit of the non-reachable range of positions of the blades.

7. The method of claim 4, wherein at step e), the control pressure is increased in the chamber of the servomotor so that a resistive torque is applied against the rotation of the blades around their orientation axes under action of the hydraulic torque exerted by the water.

8. The method of claim 1, further comprising, before step e), varying power delivered to the turbine so that the position of the blades overcomes a dead center of the means for orientating the blades comprised within the non-reachable range of positions.

9. The method of claim 1, further comprising, after step e), stopping or reducing the rotation of the turbine in the motor mode.

10. The method of claim 1, wherein it comprises, after stopping or reducing the rotation of the turbine in the motor mode, a further step consisting in orientating the blades, using the means for orientating the blades, in an energy production position and setting back the water flow to the normal energy production value.

11. A method for orientating blades of a turbine past a non-reachable range of positions in a power plant, said blades being rotatable around orientation axes distinct from a rotation axis of the turbine, the turbine comprising a servomotor for orientating the blades, said servomotor being adapted to exert an adjustable torque on the blades, the method comprising:
    a) stopping the energy production of the turbine;
    b) setting a water flow which runs the turbine to a value inferior to a normal energy production value;
    c) rotating the turbine in a motor mode using energy from a grid;
    d) adjusting the torque on the blades exerted by the servomotor to a reduced value while the turbine is still rotating and reducing a control pressure in a chamber of a servomotor such that the blades self-rotate around their orientation axes past the non-reachable range of positions under action of a hydraulic torque exerted by the water, and
    e) once the blades have overcome the non-reachable range of positions, adjusting the torque to a normal value superior to the reduced value, so that the rotation of the blades around their orientation axis is stopped in a determined position.

12. A hydro turbine for generating power from water, wherein the hydro turbine is rotatable about a central rotation axis, the hydro turbine comprising:
    at least one blade being rotatable about an orientation axis between a direct configuration and an indirect configuration;
    orientating means for orienting the at least one blade, said means being adapted to exert an adjustable torque on the at least one blade, the orientating means comprising a servomotor comprising a servomotor chamber having a control pressure, wherein the control pressure is adjustable to control the position of the at least one blade;
    wherein, by reducing the control pressure, the at least one blade is arranged to self-rotate about the orientation axis between the direct configuration and the indirect configuration and past a non-reachable range of positions via a hydraulic torque exerted by the water.

13. The hydro turbine of claim 12, wherein the at least one blade is rotatable about an associated central axis via the hydraulic torque provided by the water.

* * * * *